United States Patent [19]

Lombardi

[11] Patent Number: 5,188,061

[45] Date of Patent: Feb. 23, 1993

[54] PET AND ANIMAL NURSER

[76] Inventor: Diane F. Lombardi, 171 Hichborn St., Revere, Mass. 02151

[21] Appl. No.: 659,224

[22] Filed: Feb. 22, 1991

[51] Int. Cl.⁵ .............................................. A01K 9/00
[52] U.S. Cl. ................................................... 119/71
[58] Field of Search ......................................... 119/71

[56] References Cited

U.S. PATENT DOCUMENTS

| | | | |
|---|---|---|---|
| 2,106,562 | 1/1938 | Bucci | 119/71 X |
| 2,577,849 | 12/1951 | Henry | 119/71 |
| 3,122,130 | 2/1964 | Brown et al. | 119/71 |

FOREIGN PATENT DOCUMENTS 109121  3/1899  Fed. Rep. of Germany ........ 119/71
874535  8/1961  United Kingdom .................. 119/71

Primary Examiner—Gene Mancene
Assistant Examiner—Thomas Price

[57] ABSTRACT

A new and improved pet and animal feeder which provides small pets and animals with nursing means within a surrounding soft material. The present invention provides a container with a plurality of nippled, hollow protuberances simulating the teats depending from a mother. The container is positioned in a cavity within a stuffed cushion having an external shape similar to the adult version of the mammal for which the invention is being used. The nippled protuberances protrude from the cushion, through apertures in the cushion, and are available for suckling by the newborns.

6 Claims, 2 Drawing Sheets

PET AND ANIMAL NURSER

BACKGROUND OF THE INVENTION

This invention relates to animal husbandry and particularly to suckling appliances for pets and animals which are too small to take solid foods.

One of the most serious problems faced by pet owners and animal breeders is that posed by newborns which must be hand fed either because of the mother's inability to satisfactorily feed the entire litter, the mother's death or for some other reason. Newborn pets and animals are generally difficult to feed because of their small size which requires that they be fed frequently but in small amounts. As a result even a small litter will require continuous attention by a person to maintain the milk at proper temperature and available to the newborn pet or animal. Moreover, many mammals do not feed well unless the nipple is surrounded by some soft, preferably warm area against which they may snuggle, place their forepaws and/or against which they may push with their noses.

SUMMARY OF THE INVENTION

The present invention provides an improved pet and animal nurser. As such, the general purpose of the present invention, which will be described subsequently in greater detail, is to provide a new and improved pet and animal feeder which provides small pets and animals with nursing means within a surrounding soft material.

To attain this, the present invention provides a container with a plurality of nippled, hollow protuberances simulating teats depending from a mother. The container is positioned in a cavity within a stuffed cushion having an external shape similar to the adult version of the mammal for which the invention is being used. The nippled protuberances protrude from the cushion, through apertures in the cushion, and are available for suckling by the newborns.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE PREFERRED EMBODIMENT

Figure 1:
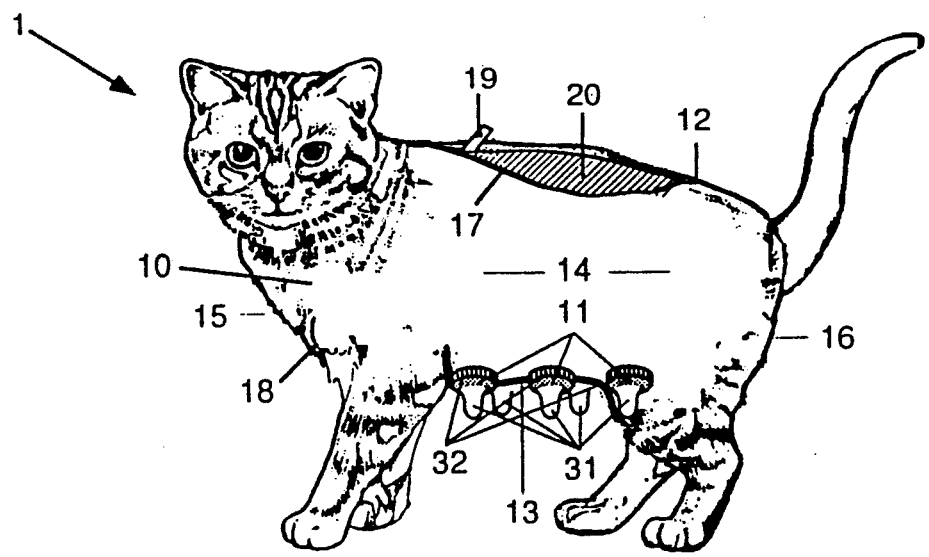
FIG. 1 is a perspective view of the present invention.
Figure 2:
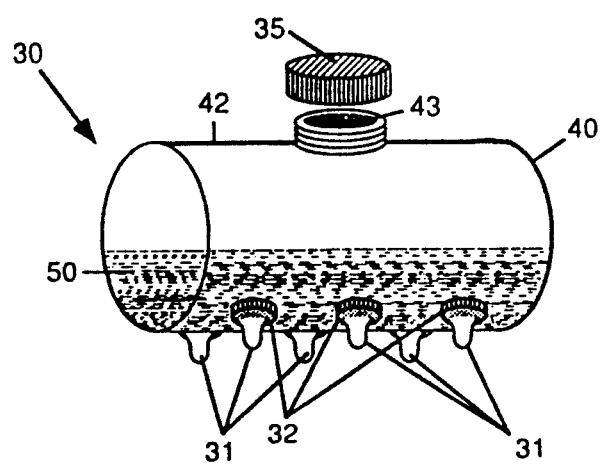
FIG. 2 is a perspective view of the nursing assembly.
Figure 3:
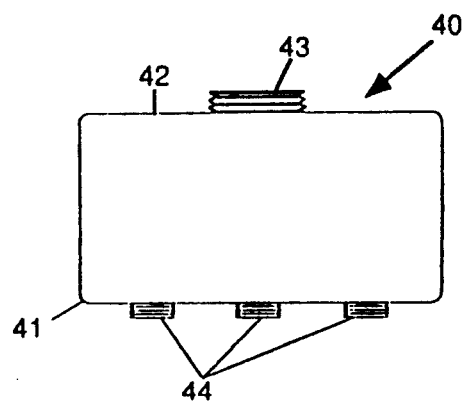
FIG. 3 is a side elevational view of the nursing assembly container.
Figure 4:
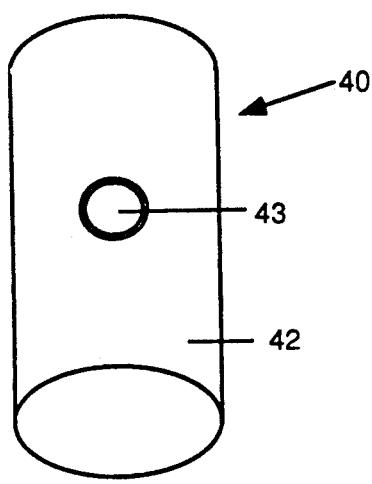
FIG. 4 is a top plan view thereof.
Figure 5:
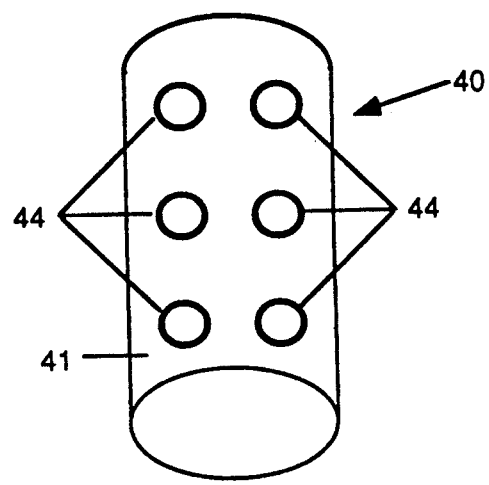
FIG. 5 is a bottom plan view thereof.
Figure 6:
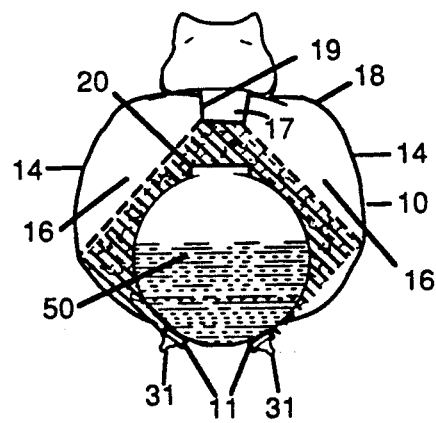
FIG. 6 is a back view of the invention of FIG. 1, partially in section.
Figure 7:
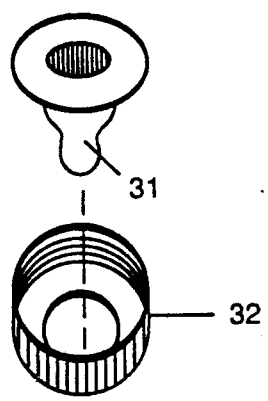
FIG. 7 is a perspective view of a screw on nipple.
Figure 8:
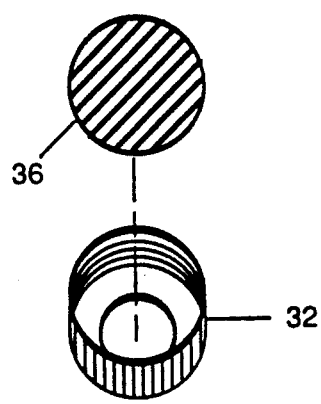
FIG. 8 is a perspective view of a screw on cap plug.

Referring to the drawings in detail wherein like elements are indicated by like numerals, there is shown an embodiment of the invention 1 incorporating a pet and animal nurser according to the instant invention. The invention 1 is a mock animal made to resemble a particular species, i.e., dog, cat, etc. The invention 1 is designed to take the place of the newborn mammal's mother in the event the mother should die, abandon its young, take ill, or any other reason. The invention 1 is designed not only to resemble the newborn mammal's mother but also is designed to suckle the newborn as well. The invention 1 is comprised of a stuffed cushion mother form 10 and a nursing assembly 30. The external surface 18 of the form 10 is comprised of a soft, resilient, fur-like material. The nursing assembly 30 is positioned within the form 10. The nursing assembly 30 has hollow, nippled protuberances 31 which extend through corresponding openings 11 in the form 10.

As stated above, the form 10 has the shape of the mammal mother. For exposition purposes, a cat shape is used. The form 10 has a top 12, bottom 13, two sides 14, front 15, and back 16. The top 12 of the form 10 represents the mother's back. The form bottom 13 represents the mother's underbelly. The longitudinal axis of the form 10 is from front 15 to back 16. The form 10 has an interior cavity 20. The interior cavity 20 is accessed by means of a longitudinal opening 17 in the form top (back) 12. The nursing assembly 30 is placed into the form cavity 20 and accessed by means of said opening 17. The longitudinal opening 17 is closed with conventional fastener means 19 such as snaps, hooks, laces, zipper, Velcro, or the like. The form apertures 11 discussed above begin in the interior cavity 20 and extend through the form underbelly or bottom 13. The interior cavity inner wall 21 has several Velcro straps 22 attached thereto. The purpose of these straps 22 is to hold the nursing assembly 30 in place within the cavity 20. Insertable stuffing pads 25 may also be used in the cavity 20 about the nursing assembly 30 to further position the assembly 30. The pads 25 may also contain heat means to help warm the container contents 50.

The nursing assembly 30 includes a generally cylindrical container 40. The container may be made of any sanitary, liquid containing material such as plastic, glass, stainless steel and the like. The container's longitudinal axis is coincident with the form longitudinal axis when the container 40 is inserted into the form cavity 20. The container 40 is defined as having an underbelly radial side 41 and a top radial side 42. The top radial side 42 has a central threaded opening 43 sealable with a threaded cap 35. Milk 50 is placed into the container 40 through the central opening 43. The container underbelly radial side 41 has several hollow, threaded stems 44. In this embodiment, four stems 44 are used. As little as one and as many as twelve stems 44 may be conveniently used. The threaded stems 44 correspond to the form apertures 11 and extend through the apertures 11 just past the form's outer surface 18. External nipples 32 are screwed onto the stems 44 thereby forming hollow, nippled protuberances 31 which appear to the newborn as its mother's teats. The container 40 is supplied with threaded cap plugs 36 which are used in place of nipples 32 on the stems 44 when not in use. Leakage from the container 40 is thereby minimized and larger containers 40 may be used by fewer newborns.

It is understood that the above-described embodiment is merely illustrative of the application. Other embodiments may be readily devised by those skilled in the art which will embody the principles of the invention and fall within the spirit and scope thereof.

I claim:

1. An improved pet and animal nurser comprising: a stuffed cushion with an outer surface and an externally accessible internal cavity with a plurality of apertures leading to said outer surface; and a nursing assembly, positioned within said cushion internal cavity, comprised of a liquid holding container with a plurality of hollow stems protruding through said plurality of apertures; and a plurality of nipples for attachment to said stems, said cushion has a top, bottom, two sides, front and back and an external surface comprised of a soft, resilient, fur-like material, said interior cavity is accessed by a longitudinal opening in the cushion top, fastener means for securing said longitudinal opening, said plurality of apertures begin in said interior cavity and extend through said cushion bottom, and said interior cavity has an interior wall and a plurality of straps attached thereto for holding said nursing assembly in place within said cavity.

2. A nurser as recited in claim 1 further comprising: a plurality of pads insertable into said internal cavity about said nursing assembly.

3. A nurser as recited in claim 2 wherein:
said liquid holding container has a generally cylindrical shape and is so positioned within said cushion internal cavity that the container's longitudinal axis is coincident with the longitudinal axis of said cushion.

4. A nurser as recited in claim 3 wherein:
said container has a top radial side with a central opening sealable with a cap.

5. A nurser as recited in claim 4 wherein:
said container has a bottom radial side with a plurality of hollow stems which correspond to and extend through said apertures just past said cushion's outer surface.

6. A nurser as recited in claim 5 further comprising:
a plurality of cap plugs for use in place of nipples on said stems when not in use.

* * * * *